INVENTORS
Lawrence F. Athy
Harold R. Prescott
BY
ATTORNEY

Nov. 11, 1941.   L. F. ATHY ET AL   2,262,419
METHOD OF ELECTROMAGNETIC LOGGING
Filed April 9, 1938   4 Sheets-Sheet 3

INVENTORS
Lawrence F. Athy
Harold R. Prescott
BY
ATTORNEY

Patented Nov. 11, 1941

2,262,419

UNITED STATES PATENT OFFICE 2,262,419

METHOD OF ELECTROMAGNETIC LOGGING

Lawrence F. Athy and Harold R. Prescott, Ponca City, Okla., assignors to Continental Oil Company, Ponca City, Okla., a corporation of Delaware Application April 9, 1938, Serial No. 201,172

9 Claims. (Cl. 175—182)

Our invention relates to a method of electromagnetic logging, and more particularly to a method of electromagnetic logging of a bore hole.

In geological explorations, accurate knowledge of the various subsurface strata is obtained by taking cores by means of core drilling. A record or log is kept showing the different formations traversed. This is a tedious operation and sometimes inaccuracies result due to the difficulty of ascertaining exactly when one stratum has been left and another has been entered.

Where a drill hole is already in existence, it is frequently desirable to check the thicknesses of the various strata. Frequently valuable geological information may be obtained by correlating a plurality of spaced drill holes. For this work accurate knowledge of the depth and thicknesses of the various strata is essential.

One object of our invention is to provide a novel method of electromagnetically logging a bore hole.

Another object of our invention is to provide a method of electrical logging of bore holes which will enable the use of small current densities and small potentials while obtaining great accuracy in results.

Still another object of our invention is to provide a method of electrical logging of bore holes employing a low fixed frequency, the apparatus being such that it is non-responsive to frequencies higher than the fixed frequency or to frequencies lower than the fixed frequency.

A further object of our invention is to provide a method and apparatus for electrical logging of bore holes which will be less susceptible to ground currents and magnetic storms.

Other and further objects of our invention will appear from the following description.

In the accompanying drawings which form part of the instant specification and are to be read in conjunction therewith, and in which like reference numerals are used to indicate like parts in the various views.

The electrical logging methods of the prior art are largely based on resistivity measurement. We propose a novel method of electrically logging bore holes in which the magnetic effects of electrical strata are employed.

Figure 1:
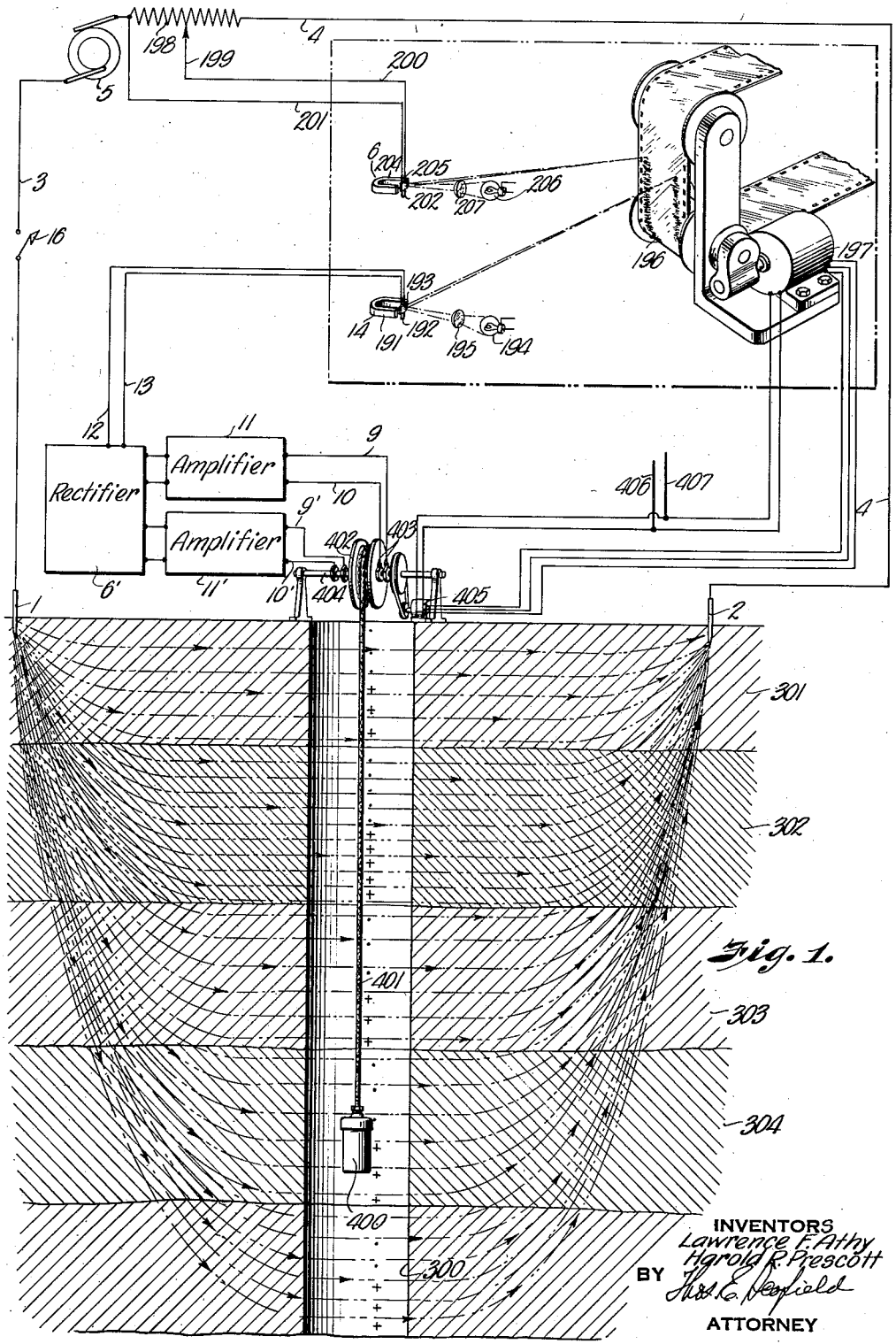
Fig. 1 is a diagrammatic view of apparatus capable of carrying out the method of our invention.

Referring now to Fig. 1, an alternator 5 is adapted to deliver alternating potential through conductors 3 and 4 to ground stakes 1 and 2 placed on the opposite sides of a bore hole 300. Current will flow between current stakes 1 and 2 in various paths shown by construction lines in Fig. 1. A galvanometer 6 is adapted to measure current flowing between current stakes 1 and 2. Various beds or strata 301, 302, 303 and 304 are shown in Fig. 1. Let us assume that bed 301 is of medium resistance, and bed 302 is of low resistance (high conductivity), bed 303 of medium resistance and bed 304 of low resistance, and that the instantaneous current flow is indicated by the direction of the arrows on the construction lines extending between current stakes 1 and 2 through the various beds. It will be noted that there are a series of dots and crosses in the bore hole adjacent the constructional lines showing the direction of the instantaneous current flow. A dot indicates that the magnetic flux is flowing at right angles to the plane of the drawing toward the observer, that is, a dot will represent the point of an arrow flying toward the observer, while a cross indicates a direction of magnetic flux downwardly from the plane of the drawing, that is, a cross will indicate the feathers of an arrow flying directly away from the observer. The directions of magnetic flux thus indicated can be readily checked by the application of the right hand rule, and it will be readily apparent that if the direction of flux is in one direction in the upper half of the bed it will be in the opposite direction in the lower half of the bed. It will also be apparent that changes in direction of magnetic flux will indicate either the passing of the electrical center line of a bed, or the passing from a bed of one conductivity to a bed of another conductivity.

It is to be understood that the foregoing description is with reference to the diagrammatic view shown in Fig. 1, given to simplify the explanation of our method. In each strata in Fig. 1 the flux direction is indicated for each bed as though the other strata were not present. The final flux at any position within a stratum is the sum total of the separate flux values contributed by adjacent strata. In actual practice, not only will each bed have a horizontal magnetic flux contributed by its own conductivity and its own magnetic susceptibility, but it will have, too, a magnetic flux which overlaps from the beds on each side. In an actual case, where there are large numbers of geological strata present, each having its individual conductivity and magnetic susceptibility, the prediction of the actual magnitude of the horizontal magnetic flux at any point within the bore hole would be very involved and complex.

It is to be remembered, therefore, that the description given is with respect to the diagrammatic view shown. The significant thing is that each geological strata has its own value of conductivity and magnetic susceptibility which tends to remain constant laterally along the bed. It is for this reason that a log of the variations of the magnetic flux in one bore hole may be compared with a similar log of another bore hole to determine the attitude, dip and interval between geological beds.

It will be further apparent to those skilled in the art that only an extreme conductivity between two adjacent strata would cause a net reversal of the field direction at any point. In the diagrammatic view it is assumed that the adjacent strata are formed of materials possessing extreme differences in conductivity. In actual practice, these conditions are not frequently met except in the case of ore beds or the like. In the usual case, the variations of conductivity will not be sufficiently great to cause a reversal in the sum total of the flux within the bore hole. The differences in conductivity, however, will cause appreciable variations of the total flux, which variations are employed in our invention for logging the bore hole.

For example, in field work a strata of limestone is frequently found adjacent a strata of shale. The conductivity of shale is often of the order of ten times as great as that of limestone. This difference in conductivity will produce a decided variation in the flux. Again by way of example, the magnetic susceptibility of a strata containing reworked igneous rock frequently is between fifty to a hundred times as great as that of normal sedimentary rock. This difference in magnetic susceptibility will produce a marked variation in the flux.

It will be apparent, therefore, that the flux direction and its magnitude will provide an index of the electrical conductivity of various strata. We provide a receptor susceptible to alternating magnetic flux. This receptor is indicated diagrammatically by the reference numeral 400 and is suspended by a flexible cable 401 housed upon a reel 402, the terminals of the cable being connected to conductors 9, 10, 9' and 10' by any suitable means, such as brushes 403 and the slip rings. The reel 402 is mounted upon a shaft 404 which is driven through any suitable transmission by a synchronous motor 405, connected in parallel with another synchronous motor 197, adapted to move a sensitized strip 196 upon which a record is taken, as will hereinafter be more fully described, power being furnished from main line wires 406 and 407.

Figure 6:
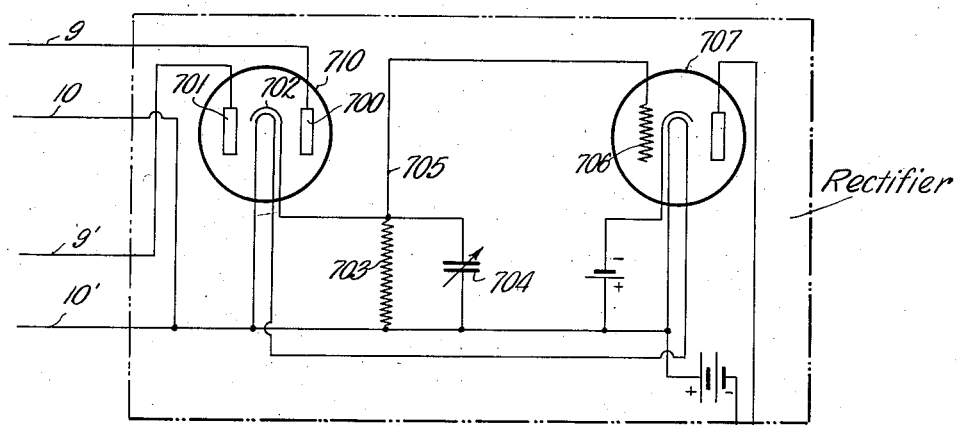
Fig. 6 is a schematic view of a rectifier unit employed in carrying out our invention.

The output of receptor 400 is impressed through conductors 9 and 10 upon a receiver and amplifier indicated diagrammatically by the reference numeral 11, and through conductors 9' and 10' upon a receiver and amplifier indicated diagrammatically by the reference numeral 11'. The output of the amplifiers is impressed upon a rectifier indicated by the reference numeral 6' and shown diagrammatically in Fig. 6. The output of the rectifier is led by conductors 12 and 13 to oscillograph, shown generally in Fig. 1 by the reference numeral 14. The oscillograph 14 may comprise a field magnet 191 and an oscillograph element 192 which is well damped so as to produce low frequencies faithfully in wave form and phase. A mirror 193 is carried by the oscillograph element 192. Light from incandescent lamp 194 is projected by a lens 195 upon the mirror 193 for reflection upon a light sensitive medium 196 provided with an electric motor 197 for moving the light sensitive medium past the light spot reflected by mirror 193.

A resistance 198 is placed in one of the output leads 4 leading to the electrode 2. The resistance is tapped by a variable arm 199. It will be readily apparent that leads 200 and 201 across the resistance 198 will indicate the current flowing from the current source 5. The oscillograph element 202 will measure the voltage across the resistance. Since the resistance is fixed, the voltage across the resistance will vary as a function of the current. The oscillograph element 202 is supported within the field of magnet 204, and carries a mirror 205 upon which light from an incandescent lamp 206 is projected by a lens 207. The mirror 205 reflects the light upon the sensitized film 196 in side by side relation with light beams from oscillograph element 192. The oscillograph elements 192 and 202 are quite high in natural frequency, and for the frequencies recorded by them may be regarded as practically without inertia.

A key 16 is adapted to momentarily close the circuit in order to obtain transient effects. By "momentarily" is meant a short interval of time, as for example, five seconds.

We employ a low frequency current having a good wave form to energize the transmitter, and we employ a receiver with a high pass filter and a low pass filter, enabling the rejection of currents higher in frequency than the exciting source and currents lower in frequency than the exciting source, followed by the amplification of the filtered current with its subsequent recording upon a record strip or by readings of the current flow and voltage employed from which magnetic flux variations may be plotted and recorded to obtain accurate readings in both cased and uncased bore holes.

Figure 2:
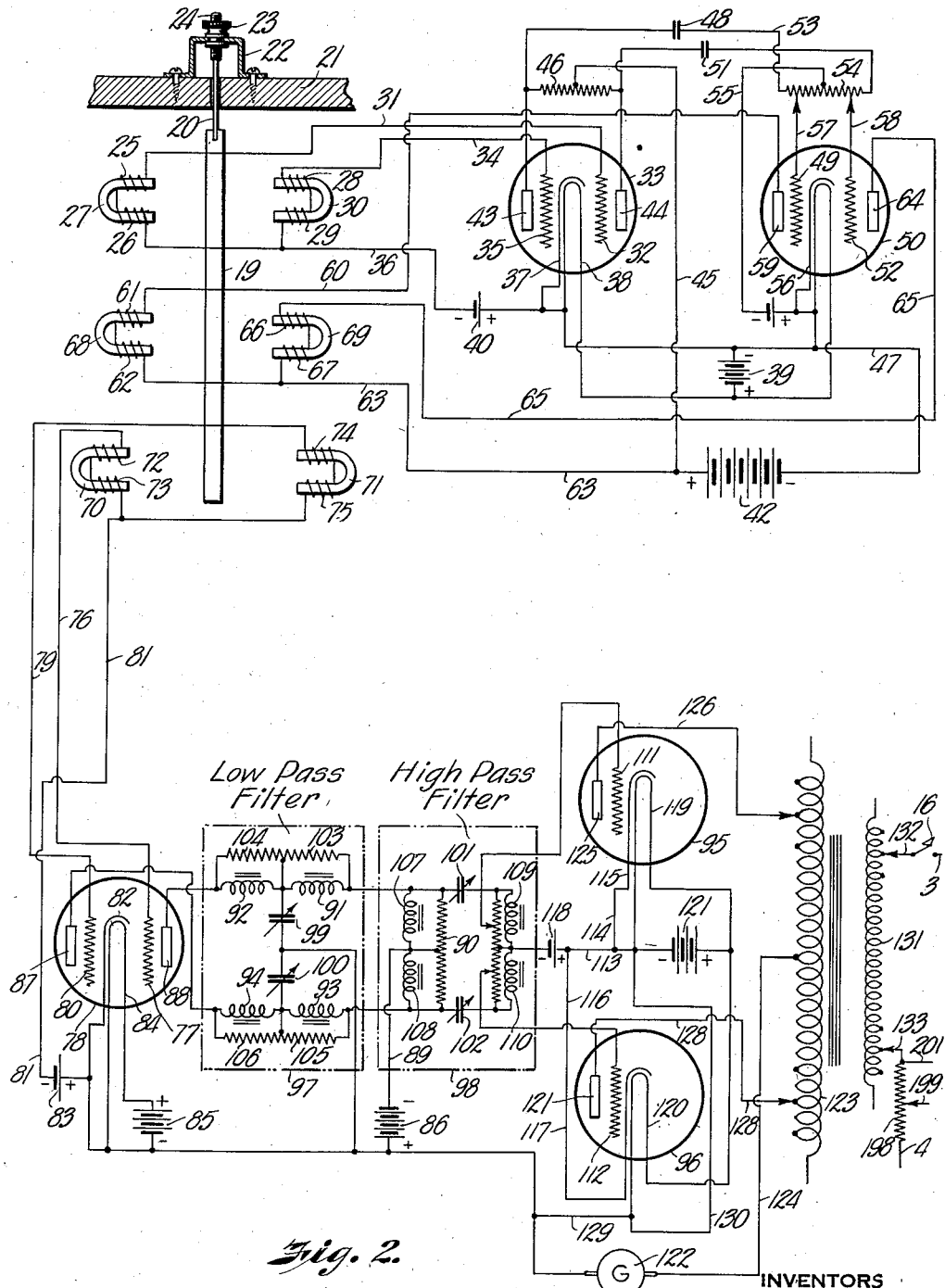
Fig. 2 is a schematic view showing the exciting source or alternator used in carrying out the method of our invention.

The alternator shown diagrammatically at 5 is shown in detail in Fig. 2, it being understood that any suitable source known to the art of obtaining a low frequency current of a fixed frequency may be employed in carrying out the method of our invention.

The alternator shown in Fig. 2 is suitable for very low frequencies such as five cycles per second and at the same time may be employed for frequencies as high as five hundred cycles per second. A vibrating member 19 is carried by a flexible spring member 20 from any suitable support 21 by means of an adjusting arrangement 22. The natural frequency will be determined by the length and shape of the vibrating member 19 and by the length and stiffness of the flexible spring suspension 20. The length of the spring suspension 20 may be varied by adjusting nut 23, raising or lowering the member 19 by means of threaded member 24 as can readily be appreciated by reference to Fig. 2. Coils 25 and 26 are wound around a small permanent magnet 27. Coils 28 and 29 are wound around a small permanent magnet 30. The coils 25, 26, 28 and 29 are exciting coils which develop a voltage as the vibrating member 19 oscillates. This voltage is induced in the windings when the external field of the magnet is altered by the member 19 alternately coming closer and then farther away from the coils, it being understood, of course, that the member 19 is of magnetic material or a member carrying pieces of magnetic material attached to the sides, which magnetic material is adapted to alter the external field of the small magnets 27 and 30. The voltage induced in the exciting coils 25 and 26 is led by conductor 31 to one grid 32 of a thermionic tube 33. The voltage induced in coils 28 and 29 is impressed by conductor 34 upon the grid 35 of the thermionic tube 33, the return portion of the circuits being comprised by conductor 36 which is connected to the cathode 37 of the tube 33. The cathode 37 is heated by a filament heater 38 to which current is supplied from a battery 39. A battery 40 furnishes bias voltage for the grid. A battery 42 supplies positive potential to the plates 43 and 44 of the tube 33, through a conductor 45 and center tapped resistance 46, the return in the plate circuit being from the negative terminal of the battery 42 through conductor 47 to cathode 37. Plate 43 is coupled by condenser 48 to the grid 49 of thermionic tube 50. Plate 44 is coupled by condenser 51 to the grid 52 of the tube 50. The other side of condenser 48 is connected by conductor 53 to one end of a resistance 54. The other side of condenser 51 is connected to the opposite end of the resistance 54. The resistance 54 is center tapped by a conductor 55 connected to cathode 56 of tube 50. Conductor 57 adjustably connects grid 49 to the resistance 54, while conductor 58 adjustably connects grid 52 to the resistance 54. The adjustment of conductors 57 and 58 controls the output of tube 50 acting as a volume control. The plate 59 of the tube 50 is connected to the positive terminal of battery 42 through conductor 60, windings 61 and 62, and conductor 63. The plate 64 of the tube 50 is connected to the positive terminal of battery 42 by conductor 65, windings 66 and 67, and conductor 63. The windings 61 and 62 are about a soft iron electromagnet core 68. The windings 66 and 67 are about a soft iron electromagnet core 69. The windings 61, 62, 66 and 67 are driving windings. The output of tube 50 is controlled to supply sufficient energy to keep the member 19 in oscillation. The driving electromagnets 68 and 69 are positioned as far as possible on each side of oscillating member 19 and still maintain oscillation. This reduces damping caused by residual magnetism of the cores and allows member 19 to oscillate as freely as possible. The amplitude of motion of vibrating member 19 is quite low in order that the motion may be as free of harmonics as possible. Mounted on each side of oscillating member 19 are small permanent magnets 70 and 71. Windings 72 and 73 are disposed about the poles of magnet 70. Windings 74 and 75 are disposed about the poles of magnet 71. As the member 19 of magnetic material vibrates, driven by driving electromagnets, as described above, it will alternately approach and recede from each of the small permanent magnets 70 and 71, varying the external magnetic field and inducing voltages in the windings 72 and 73, and 74 and 75. The pickup windings 72, 73, 74 and 75 are well separated from the vibrating member 19, are balanced and adjusted to have as nearly as possible a linear relationship between changes in the external flux of the small magnets with changes in the position of the vibrating member 19. This will give induced electrical voltages substantially as free of harmonics as the motion of vibrating member 19. The voltages induced in windings 72 and 73 are impressed by conductor 76 upon one grid 77 of thermionic tube 78. The voltages induced in windings 74 and 75 are impressed by conductor 79 upon another grid 80 of the tube 78, the return circuits being completed by conductor 81 to cathode 82 of tube 78. The grids are biased by a "C" battery 83. The cathode is provided with a filament heater 84 to which current is supplied from an "A" battery 85. Positive potential from "B" battery 86 is supplied to the plates 87 and 88 of the tube 78 through conductor 89, center tapped resistance 90 and respective groups of choke coils 91, 92, and 93, 94 as can readily be seen by reference to Fig. 2. The thermionic tube 78 will amplify the induced voltages generated in windings 72, 73 and 74, 75. The amplified voltage is passed to thermionic tubes 95 and 96 for further amplification through a low pass filter 97 and a high pass filter 98. The condensers 99 and 100 of the low pass filter are set to reject frequencies higher than the fundamental of the vibrating member 19. The condensers 101 and 102 of the high pass filter are adjusted to reject frequencies lower than the fundamental of vibrating member 19. In parallel with choke coil reactances 91 and 92 of the low pass filter are resistances 103 and 104. In parallel with choke coil reactances 93 and 94 are resistances 105 and 106. Resistances are also placed in parallel with each choke coil reactance 107, 108, 109 and 110 of the high pass filter 98. These inductances 107, 108, 109 and 110 must be quite large in order to provide a peak response at the low frequencies used. The resistances are of such value that the network is well damped in order that electrical oscillations will not be generated, enabling the natural frequency of the vibrating member 19 to be reproduced faithfully in wave form. In this connection, it is unimportant whether or not phase change occurs.

The output of the high pass filter is impressed upon the grids 111 and 112 of tubes 95 and 96, the return circuits being completed through common conductor 113 and conductor 114 to cathode 115 of tube 95 and conductor 116 to cathode 117 of tube 96, a biasing "C" battery 118 being provided. The tubes 95 and 96 are of the indirectly heated cathode type and are provided with filament heaters 119 and 120, respectively, which are supplied energy from an "A" battery 121. "B" power is supplied to the plate circuits of tubes 95 and 96 by a generator 122. The output of tubes 95 and 96 is connected to the primary winding 123 of the transformer, the power being supplied through conductor 124 to a center tap of the primary 123. Plate 125 of tube 95 is adjustably connected by conductor 126 to taps at one end of the primary 123. Plate 127 of tube 96 is adjustably connected by conductor 128 to taps at the other side of primary 123. The other side of the generator 122 is connected to cathodes 119 and 120 by conductor 129, the cathodes being interconnected by conductor 130.

The transformer of which winding 123 is a primary must be made with good iron and a high primary inductance in order to efficiently deliver energy at the low frequencies desired and in order to be as free of harmonics as possible. The secondary winding 131 is adapted to conduct the output energy of the alternator to the electrodes 1 and 2 through conductors 3 and 4. The conductors are connected to the secondary winding 131 of the transformer by adjustable connections 132 and 133. It is desirable to have these connections adjustable in order to properly match the impedance of the load circuit to the impedance of the plate circuits of tubes 95 and 96.

For higher frequencies, the spring 20 may be discarded and the vibrating member 19 may be clamped in the mounting or a tuning fork may be used as the vibrating member. When higher frequencies are used, the harmonics are less and the low pass filter and the high pass filter may be eliminated.

As mentioned hereinbefore, there are other sources of alternating current with fairly good wave form known to the art which may be used. The well known beat oscillators using push-pull detection and push-pull amplification can be designed to have a very low harmonic content to frequencies as low as fifteen or ten cycles per second if the circuits are well separated by buffer stages. Buffer stages can be used in connection with the alternator shown in Fig. 2 where the load delivered by the power stage is great. In this case, a buffer stage will be placed between the thermionic tube 78 and the output tubes 95 and 96.

The above variations are known to the art and may be used in carrying out the method of our invention.

Figure 3:
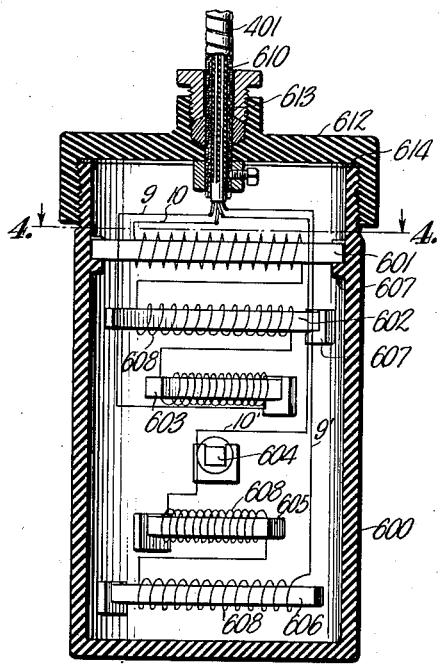
Fig. 3 is a schematic sectional view of a receptor of use in carrying out the method of our invention.
Figure 4:
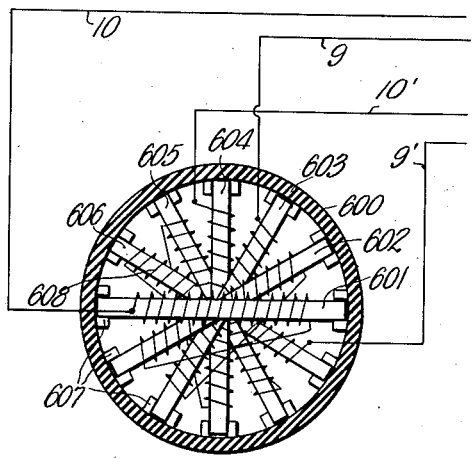
Fig. 4 is a sectional view taken on the line 4—4, Fig. 3.

The filtered low frequency current flows between ground stakes 1 and 2 through a plurality of paths, the current flowing through various strata varying in accordance with their respective resistivities. In order to determine the flux direction and magnitude we provide a receptor shown diagrammatically in Figs. 3 and 4. It comprises a non-magnetic and if desired a non-metallic housing or casing 600 in which is positioned a plurality of cores 601, 602, 603, 604, 605, 606, made of a material with a high permeability at fairly low magnetic flux densities.

Our receptor is responsive to horizontal flux intensity. This flux intensity is determined by the conductivity of layers and also by the magnetic susceptibility of layers. It is well known to the art that the conductivity of different geological beds varies greatly. Apart from their conductivity their magnetic susceptibility may vary depending upon the material of which they happen to be formed. A bed, for example, containing large amounts of ferrous materials will have a greater magnetic susceptibility than other beds. This fact enables our method to be employed where conductivity methods might fail. Two beds might have identical conductivities and yet have different magnetic susceptibilities. Resistance methods of electrical logging, therefore, would fail to indicate the different beds, which would be discovered when their magnetic susceptibility was taken into account.

For purposes of illustration we have shown six cores positioned within the receptor by means of lugs 607. The cores are provided with windings 608. The windings of cores 601, 602 and 603, are connected in series and terminate in conductors 9 and 10, forming elements of the cable 401. The windings of cores 604, 605 and 606 are connected in series and terminate in conductors 9' and 10', forming elements of the cable 401. By reference to Fig. 1, it will be seen that conductors 9 and 10 are connected to amplifier 11, while conductors 9' and 10' are connected to amplifier 11'.

In practice it is not practical to orient the receptor, and, therefore, it must be independent of rotational position. In order to achieve this independence we position successive respective cores rotated 30° from each other around the vertical axis. This can be readily seen by reference to Fig. 4. It will be understood, of course, that a slightly less directional receptor may be obtained by the use of a greater even number of cores rotated through a less angle. In this case, however, it will be necessary to increase the length of the receptor. This is undesirable since we prefer to confine the length of the receptor to appreciably less than the thickness of the beds it is desired to explore in order that the receptor itself will not bridge over the magnetic variations sought. The cable 401 passes through the receptor housing cover plate 612 through a suitable stuffing box 613. The cover is sealed upon a gasket 614. The voltages induced in the coils 608 are, as pointed out above, led by conductors 9, 10, 9' and 10' for delivery to the receivers and amplifiers, shown diagrammatically by the reference numbers 11 and 11' in Fig. 1. Receiver and amplifier 11, is shown more in detail in Fig. 5, to which reference is now made. The potential is received through condensers 134 and 135 and impressed at the ends of a resistance 136. The resistance 136 is center tapped by a conductor 137 which is connected to the cathode 138 of a thermionic tube 139, the usual "C" battery 140 being used to bias the grid. The cathode 138 is provided with a filament heater 141 to which energy is supplied by means of an "A" battery 142. The grids 143 and 144 of the tube 139 are connected to the resistance 136 by adjustable conductors 145 and 146. The adjustment of these conductors acts as a volume control and varies the potential impressed upon the grids 143 and 144. Voltage from "B" battery 147 is impressed upon plate 148 of tube 139 through conductor 149, reactance 150, reactance 151, reactance 152 and conductor 153. Voltage from the "B" battery 147 is impressed upon the plate 154 through conductor 149, reactance 155, reactance 156, reactance 157 and conductor 158. The output of thermionic tube 139 is impressed upon the grids 159 and 160 of tubes 161 and 162 through a low pass filter 163 and a high pass filter 164 through conductors 165 and 166.

The condensers 167 and 168 of the low pass filter are set to reject frequencies higher than the frequency selected to be impressed upon the tubes 161 and 162. The condensers 169 and 170 of the high pass filter are set to reject frequencies lower than the source frequency. It will be noted that each of the reactances in both filters is provided with resistances connected in parallel therewith to provide electrical damping of the entire network enabling the reproduction of the fundamental frequency of the source faithfully. It will be noted that conductors 165 and 166 connecting the output of the high pass filter to the respective grids 159 and 160 may be adjusted upon the resistances 171 and 172 to act as a further means for controlling the overall amplification. By means of the filters, the amplifier delivers a reproduction of the magnetic flux at the receptor with stray effects such as ground currents, electrolytic effects and variable resistance at the current electrodes materially suppressed.

The grids 159 and 160 return circuits are completed through conductors 173 and respective cathodes 174 and 175, a customary "C" biasing battery 176 being provided. Filament heater 177 of tube 161 and filament heater of tube 162 are supplied current by "A" battery 179. Plate 180 of tube 161 and plate 181 of tube 162 are connected to the positive terminal "B" battery 147 through conductor 182 which is connected to a center tap of the primary 183 of the output transformer. The opposite ends of the primary winding 183 are connected respectively by conductors 184 and 185 to plates 180 and 181 of tubes 161 and 162, and the plate circuit is completed through respective cathodes 174 and 175 through conductor 186 to the negative terminal of the "B" battery 147. The secondary winding 187 of the output transformer impresses the voltage received through conductors upon the rectifier unit shown in Fig. 6.

It will be seen that the voltage induced in the coils around cores 601, 602, and 603 will be amplified by the amplifier 11. The filters will reject all useless and extraneous voltages. The output is impressed upon the anode 700 of a duo diode tube 710, shown in Fig. 6. When the anode 710 is positive, current is passed to the cathode 702. This current is filtered by a resistance 703 and a capacity 704 to give a smoothed out potential which is impressed by conductor 705 upon the grid 706 of the output tube 707. The current in the output of tube 707 is determined by the potential on the grid 706. The output current of the output tube 707 energizes the oscillograph element 192 shown in Fig. 1. Its amplitude is an index of the flux density received by coils wound on cores 601, 602 and 603.

Figure 5:
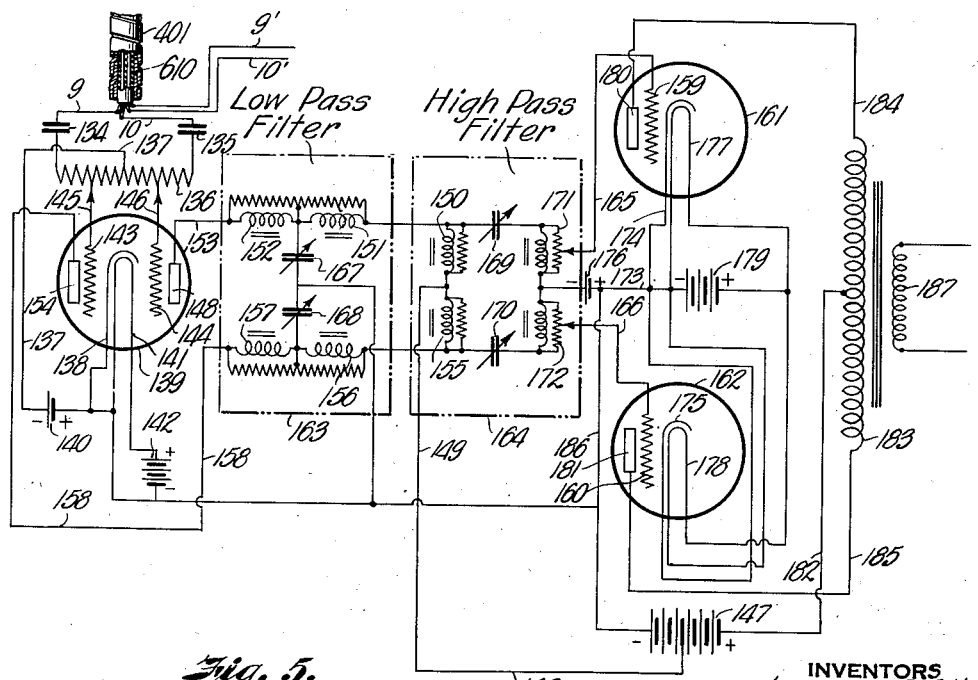
Fig. 5 is a diagrammatic view of a receiver and amplifier used in carrying out the method of our invention.

Similarly, the voltages induced in coils wound upon cores 604, 605 and 606, are amplified by amplifier 11', which is as shown in Fig. 5. The amplified voltage filtered of useless and extraneous voltages is impressed upon the anode 701 of the tube 710 in Fig. 6. When this anode is positive, current is passed to the cathode 702. This current is filtered by resistance 703 and capacity 704 and is thus smoothed out and led by conductor 705 to the grid 706 of the output tube 707. The output tube will give the instantaneous summation of all of the voltages induced in the coils 601, 602, 603, 604, 605 and 606 after being amplified and filtered.

It can be shown that the construction is such that the receptor is substantially non-directional. The value of resistance 303 and the capacity 304 is such as to smooth out individual humps of the rectified current to give a direct current potential. The time constant, however, is held reasonably small such that the actual value of the smoothed potential is representative of the magnitude of the horizontal flux a short instant of time earlier. Since the speed of movement of the receptor up and down the bore hole being logged is comparatively slow, the small time constant will introduce a time lag comparatively negligible in amount. The amplitude of the oscillograph trace from the rectifier unit will represent the magnitude of the flux at the position in the bore hole indicated on the record strip, which is being moved at a rate which is a function of the rate of travel of the receptor along the bore hole.

Figure 7:
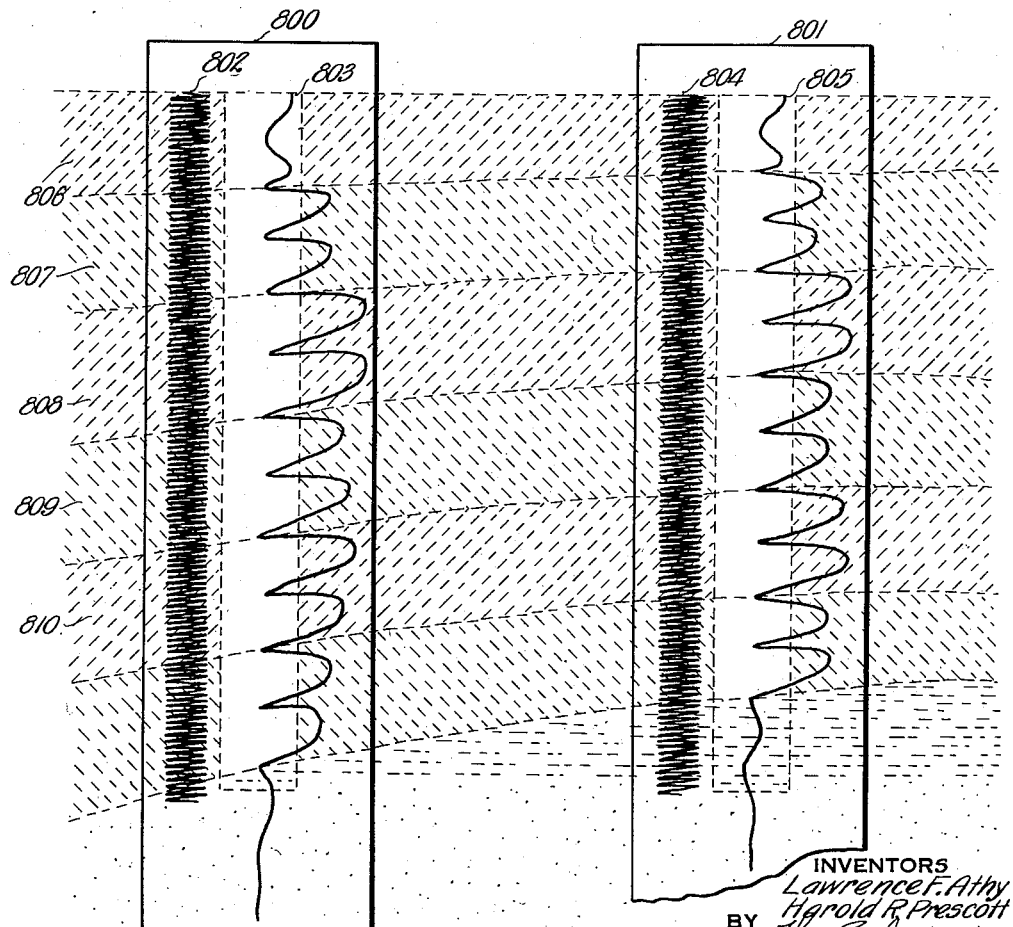
Fig. 7 is a diagrammatic view showing a pair of record strips over a phantom view of bore holes in which they were taken.

The showing in Figs. 1 and 7 of the different geological beds is greatly simplified for purposes of illustration. In the actual case not only does each bed have a horizontal magnetic flux contributed by its own conductivity and magnetic susceptibility, but it also has a magnetic flux which "overlaps" from beds on each side. In practice, large numbers of geological strata are present with their own respective individual conductivities and magnetic susceptibilities, which tend to remain constant laterally along the bed. It will be apparent that a log of the variations of the magnetic flux made in one bore hole may be compared with a similar log made in another bore hole, enabling a comparison of the two to reveal dip and intervals between geological beds. This is clearly illustrated in Fig. 7. Record strip 800 is spaced according to scale from record strip 801 to indicate the distance between two bore holes. Trace 802 on record strip 800 is the trace made by oscillograph element 202 of Fig. 1, which shows the frequency of the current source, and gives its relative amplitude. This can be varied by adjusting resistance arm 199 upon resistance 198. The trace 804 upon record strip 801 corresponds to trace 802 upon record strip 800. Trace 805 upon record strip 801 corresponds to trace 803 upon record strip 800.

Bed 806 was one of low conductivity and low susceptibility. Bed 807 was one of low conductivity and high susceptibility. Bed 808 was one of high conductivity and high susceptibility, while bed 809 was one of high conductivity and medium susceptibility. Bed 810 was one of medium conductivity and low susceptibility. It will be seen that trace 803 is similar to trace 805, enabling the position of the beds in the bore hole in which record strip 801 was made to be correlated with the beds in the bore hole in which record strip 800 was made.

The receptor, if desired, may be constructed with a less direction effect by the use of more coils uniformly placed about the periphery of the receptor and the use of more than two interconnected coil systems. This, of course, will require additional rectifying tubes and a rectifier unit with the cathodes all connected to the same point.

It will be understood that it is normally desirable to make measurements in terms of known quantities. This can be easily accomplished by calibrating the amplifiers with the measuring means at the time of field use. By connecting the input leads of the amplifiers to a source of known voltage, the volume control connections 145 and 146, and 171 and 172 may be adjusted to give the desired overall sensitivity.

It will be understood, of course, that the amplifier may be simplified and any suitable amplifier having a low pass filter and a high pass filter may be employed, in which the grid of the first tube of the amplifier is connected to one lead and the other lead serves as a return to cathode of the first tube.

By the use of a filter rejecting all useless frequencies, the amplifying system will be responsive only to the frequency of the source. This allows a much greater amplification to be used, enabling magnetic variations in the strata around a cased bore hole to be identified and recorded. The casing, of course, tends materially to minimize the magnetic flux due to erratic ground currents inside of the bore hole. By the use of an increased amplification made possible by our filter arrangement, and the use of a fixed frequency exciting source, the variations in the magnetic flux may be deduced from variations in voltage.

In use the receptor 400 is lowered by means of motor 405. This motor is a self synchronous motor and is in parallel with motor 197 controlling movement of the sensitized strip 196. It will be obvious that movement of the record strip will represent movement of the receptor downwardly into the bore hole so that the record will automatically produce curves indicating voltages received at various depths.

It will be observed that at the top of a stratum the voltages received are at a maximum and that at a middle point of the stratum they are at a minimum. There is a change, too, from maximum to minimum when one stratum is left and another entered. The resistivities and magnetic susceptibilities of the various strata may be determined by the amplitude of the induced voltages. When the conductivity of a stratum is high the induced voltages are higher than in the case when the resistivity of a stratum is high. A porous stratum or one bearing oil or gas is usually of high resistivity and the induced voltages received will usually be of low amplitude. The record strips may be placed with the inter-strip distance proportionate to the inter-bore hole spacing and a profile of the geological section may be drawn as indicated in Fig. 7. In this manner faults and other discontinuities in strata may be readily determined.

If desired, the motion of the record strip may be increased. Velocity and transient effects may be observed by momentarily closing the key 16 in Fig. 1. In such case the record strip need not be moved in proportion to the position of the receptor, and the resultant record strip may be later cut up and placed on a plotting sheet at positions proportionate to the depths at which the strata were investigated. The use of transient effects gives an additional effect since various strata possess in addition to different resistivities and magnetic susceptibilities, other characteristics which will make for a more rapid or less rapid damping of an electrical impulse passing therethrough.

The condition of the fluid in the bore hole has practically no contributing influence on the results of the electro-magnetic survey. The receptor is responsive only to horizontal flux variations and any vertical currents in the hole will have little disturbing effect.

It will be observed that we have accomplished the objects of our invention. We are able to produce bore hole logs by electromagnetic methods with great accuracy and can minimize the masking effects of electrical storms, electrolytic effects of various strata, polarizing effects and other stray electrical effects.

We are enabled to employ smaller equipment rendering it more easily portable.

It will be understood that certain features and subcombinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of electromagnetically logging bore holes in the earth including the steps of passing an alternating current of predetermined frequency between two points disposed on opposite sides of the bore hole, whereby said current will flow through various subsurface strata at different densities in accordance with respective conductivities of the strata, thereby inducing alternating magnetic fields in the bore hole adjacent various strata, said magnetic fields varying in intensity as a function of the respective conductivities of the strata, and measuring the intensity and instantaneous direction of the induced magnetic field adjacent successive strata.

2. A method of electromagnetically logging bore holes in the earth including the steps of passing an alternating current of predetermined frequency between two points disposed on opposite sides of the bore hole, whereby said current will flow through various subsurface strata at different densities in accordance with respective conductivities of the strata, thereby inducing alternating magnetic fields in the bore hole adjacent various strata, said magnetic fields varying in intensity as a function of the respective conductivities of the strata, and measuring the horizontal component of the magnetic field adjacent successive strata.

3. A method of electromagnetically logging a bore hole in the earth including the steps of passing an alternating current of predetermined frequency through the earth between two separated points disposed on opposite sides of a bore hole whereby current will flow through various subsurface strata at different densities in accordance with respective conductivities of the strata, generating induced alternating voltages from the induced magnetic fields of various strata at points along the bore hole, and measuring the amplitude of said induced voltages.

4. A method of electromagnetically logging a bore hole in the earth including the steps of passing an alternating current of predetermined frequency through the earth between two separated points disposed on opposite sides of a bore hole whereby current will flow through various subsurface strata at different densities in accordance with respective conductivities of the strata, generating induced alternating voltages from the induced magnetic fields of various strata at points along the bore hole, rejecting voltages higher in frequency than the frequency of said inducing current, rejecting voltages lower in frequency than the frequency of said inducing current, and measuring said induced voltages.

5. A method of electromagnetically logging a bore hole in the earth including the steps of passing an alternating current of predetermined frequency through the earth between two separated points disposed on opposite sides of a bore hole whereby current will flow through various subsurface strata at different densities in accordance with respective conductivities of the strata, generating induced alternating voltages from the induced magnetic fields of various strata at points along the bore hole, rejecting voltages lower in frequency than the frequency of said inducing current, and measuring said induced voltages.

6. A method of electromagnetically logging a bore hole in the earth including the steps of passing an alternating current of predetermined frequency through the earth between two separated points disposed on opposite sides of a bore hole whereby current will flow through various subsurface strata at different densities in accordance with respective conductivities of the strata, generating induced alternating voltages from the induced magnetic fields of various strata at points along the bore hole, rejecting voltages higher in frequency than the frequency of said inducing current, and measuring said induced voltages.

7. A method of electromagnetically logging a bore hole in the earth including the steps of passing an alternating current of predetermined frequency through the earth between two separated points disposed on opposite sides of a bore hole whereby current will flow through various subsurface strata at different densities in accordance with respective conductivities of the strata, generating induced alternating voltages from the induced magnetic fields of various strata at points along the bore hole, and measuring said induced voltages.

8. A method of electromagnetically logging a bore hole in the earth including the steps of passing an alternating current through the earth between two separated points disposed on opposite sides of the bore hole whereby current will flow through the various subsurface strata at different densities in accordance with the respective conductivities of the strata thereby inducing magnetic fields in accordance with the current flow therethrough, and measuring the intensity and direction of the induced magnetic fields along the bore hole.

9. A method of electromagnetically logging a bore hole in the earth including the steps of passing a current through the earth between two separated points disposed on opposite sides of the bore hole, whereby current will flow through various subsurface strata at different densities in accordance with the conductivity of respective strata to produce induced magnetic fields, moving a conductor along the bore hole, and measuring the flux density of the induced magnetic fields adjacent various strata as a function of the current flowing in said conductor.

LAWRENCE F. ATHY.
HAROLD R. PRESCOTT.